United States Patent Office 2,697,686
Patented Dec. 21, 1954

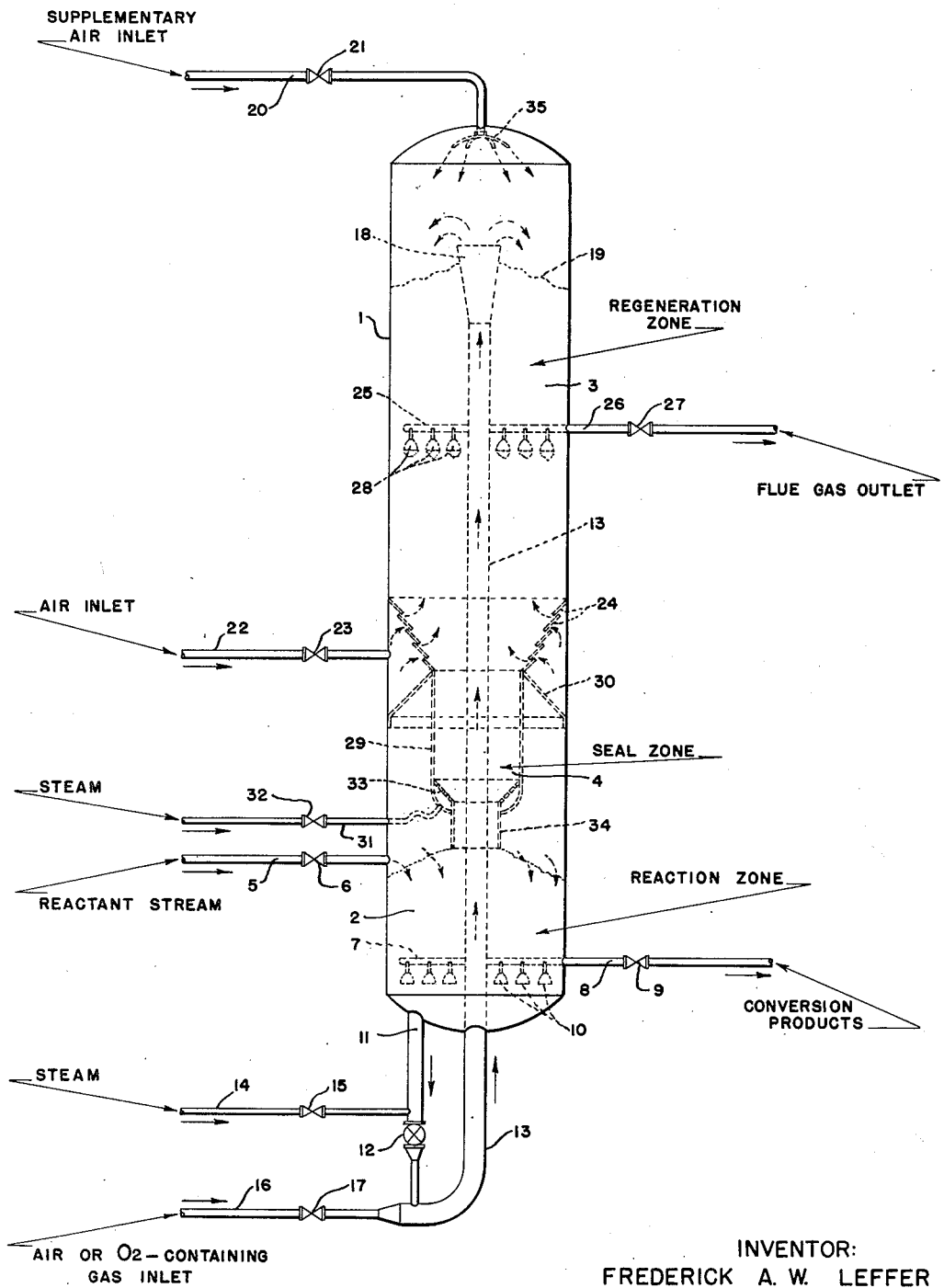

2,697,686

METHOD FOR EFFECTING THE CONVERSION OF FLUID REACTANT STREAMS BY CONTACT WITH A MOVING BED OF SOLID PARTICLES

Frederick A. W. Leffer, Riverside, Ill., assignor to Universal Oil Products Company, Chicago, Ill., a corporation of Delaware Application April 26, 1951, Serial No. 223,101

9 Claims. (Cl. 196—52)

This invention relates to an improved method for effecting the conversion of fluid reactant streams in the presence of a moving bed of subdivided solid particles, and more specifically to the conversion of hydrocarbon reactant streams with subdivided catalyst particles which are maintained in a continuously descending relatively compact bed extending through superimposed contacting zones.

The continuous operating method of the present invention is particularly advantageous for effecting catalytic conversion of hydrocarbonaceous reactants, notably catalyzed endothermic hydrocarbon conversion reactions such as catalytic cracking, catalytic reforming, dehydrogenation, dehydrocyclization, or aromatization, and the like, in which the contact material comprises a catalyst promoting a desired hydrocarbon reaction, and where the catalyst particles pass in a descending moving bed through the superimposed reaction and regeneration zones. However, the improved flow may also be used to advantage in other moving particle bed operations, such as for example in oil shale distillation, coal gasification, or the continuous thermal coking of heavy residual hydrocarbons, etc.

The present invention is further directed to a moving bed contacting operation wherein a continuously descending bed of solid particles is maintained by means of a riser line suitable for effecting a fluidized lift or fluidized transfer of particles from a lower zone to an upper contacting zone, and an opposing or split-flow is utilized within the upper contacting zone to in turn effect both concurrent and countercurrent flow of regenerating medium with respect to the downward flow of the moving bed of solid particles. Thus, in a catalytic operation, a portion of regenerating medium such as air or free oxygen-containing regenerating gas is advantageously used to fluidize and lift the catalyst particles from the lower zone to the upper regeneration zone, and this same stream is reversed in flow within the upper portion of the regeneration zone and passes downwardly through the upper portion of the descending bed of particles to an intermediate or mid-portion of the upper contacting zone. A separate portion of the air or oxygen-containing regenerating gas stream is introduced into the lower portion of the upper regeneration zone, in order that it may pass upwardly countercurrently to the descending particles within the lower portion of the upper contacting zone and reach an intermediate portion of the zone where it may be discharged together with the resulting gas stream from the portion which passes in the opposite direction and concurrently with the descending particles.

In one aspect, this invention provides a method for effecting the regeneration of subdivided solid particles with a regenerating stream in a confined zone, in a manner which comprises, carrying a stream of such particles in a fluidized phase with a fluid regenerating stream into the upper portion of the confined zone, permitting the particles to settle to the top of a continuously descending relatively compact bed of the particles maintained within the zone and passing the carrying stream concurrently downwardly with the particles to an intermediate portion of the bed therein and effecting the removal from the particles of at least a portion of the constituents thereof reactive with the regenerating stream, passing a separate stream of fluid regenerating medium upwardly through the descending bed of particles within the lower portion of the regenerating zone and to the intermediate portion of the bed therein, whereby to effect further reactivation of the solid particles or substantially complete the same, combining the opposed flow resulting fluid regeneration streams at said intermediate portion of the bed and discharging them from the reactivating zone, and continuously discharging resulting reactivated particles from the lower end thereof.

Further, the present invention provides in one embodiment a method for contacting a reactant stream with subdivided solid particles in a continuous manner which comprises, passing reactivated and heated particles downwardly through a confined reaction zone in a substantially compact descending bed and passing the reactant stream therethrough, separating and withdrawing a resulting conversion product stream from the reaction zone while continuously discharging the resulting contacted particles from the lower end thereof, commingling a stream of the discharged particles with a fluid reactivating stream and carrying them in fluidized phase through a confined path to the upper portion of a confined reactivating and heating zone of higher elevation, permitting the thus transported particles to settle to the top of a continuously descending relatively compact bed of particles in the reactivating zone and passing the reactivating stream concurrently downwardly with the particles through the upper part of the descending bed to an intermediate portion thereof within the elevated reactivating zone in a manner effecting the removal from the particles of at least a portion of the constituents thereof reactive with the reactivating medium, passing a separate portion of fluid reactivating medium upwardly through the descending bed of particles within the lower portion of the reactivating zone to the intermediate portion thereof, combining the opposed flow resulting fluid regeneration streams at the intermediate portion of the bed in said reactivating zone and discharging them therefrom, and continuously passing resulting reactivated and heated particles from the lower end of the elevated regeneration zone substantially by gravity to the upper portion of the reaction zone and into contact with the reactant stream as hereinbefore set forth.

Thus, in accordance with this operation, the fluid regenerating or reactivating medium such as oxygen-containing reactivating gas, is divided or split, with at least two streams entering into the upper regeneration zone and the descending bed therein from opposing directions, meeting at a zone at an intermediate portion of the descending bed in the regeneration zone whereby each of the separate streams passes through only a portion of the descending bed of particles and effects heating and reactivation of the particles. It is a particular advantage to split the regenerating stream in this manner in order to drastically reduce the vapor velocity within the regeneration zone, as well as reduce the diameter or cross-sectional area of the regeneration section itself. In other words, each of the split gaseous regenerating streams must pass through only about one-half of the descending bed of particles in the regeneration zone and it is not necessary to have the large pressure drop which would otherwise be necessary, where all of the stream passes in one direction through the bed. A split flow into the regeneration zone also reduces by roughly one-half the velocity of the equivalent single stream, and reduces many fold the pressure drop that a single stream would encounter passing through the entire bed. Moreover, the regeneration is initiated uniformly for the solid particles being carried in the dispersed phase in the confined path, thereby precluding the generation of hot spots which tend to form in compact moving beds at the initial contact of regenerating medium with the solid particles to be regenerated. Further, by having a countercurrent flow in the lower portion of the bed in the regeneration zone, a substantially fresh oxygen-containing stream, or air stream, encounters the particles prior to their discharge from the regeneration zone, and substantially all contaminating matter is removed from the catalyst particles prior to being introduced into the reaction zone.

In a preferred arrangement, such as in the use of catalyst particles in a hydrocarbon conversion operation, the particles are in a bed extending continuously through the upper contacting zone and through a restricted cross-sectional area seal zone to and through the lower contacting zone. Thus, with the bed of particles moving as a unit or as an uninterrupted column the downward velocity or rate of movement thereof is dependent upon the cross-sectional area or size of each of the upper and lower contacting zones. The rate of movement is the same for both the reaction and regenerating zones in a unit having superimposed zones of equal diameter. Steam or other relatively inert stripping and sealing medium may be introduced into the restricted cross-sectional area zone between the upper regeneration zone and lower reaction zone in order to prevent the penetration of gaseous or vaporous medium from one contacting zone into the other. The sealing medium is introduced into the restricted zone at a pressure and in a quantity sufficient to provide a two-way flow thereof, and thus maintain the contacting zones separate.

A preferred flow and apparatus arrangement utilizes an axially placed riser conduit extending from below the lower contacting zone substantially vertically upward therethrough and into the upper portion of the upper contacting zone. By this arrangement, the particles may be fluidized and lifted in a confined path upwardly through and in indirect heat exchange relationship with the descending bed of particles in both the lower reaction zone and the upper regenerating zone. A centrally positioned riser line also permits the use of annular and cylindrically-shaped partitioning and suspended passageway or conduit means for transferring catalyst particles from the upper zone to the lower zone without necessity of expansion joints between the confined contacting zones.

While preferably a portion of the air or controlled oxygen-content gaseous regenerating medium is utilized to effect the fluidization and lifting of catalyst particles from the lower contacting zone to the upper, in a modified embodiment of the operation, a gaseous medium such as a used regenerating or combustion gas of low free-oxygen-content may be utilized as least in part to effect the fluidized lifting of particles to the upper portion of the upper regeneration zone, and either supplementary regenerating medium or a split or divided portion of the regenerating medium (which in the case of a catalytic operation for the conversion of hydrocarbonaceous reactant is either an air stream or a controlled oxygen-containing stream) is introduced directly into the upper portion of the upper regeneration chamber while the other divided or split portion of the air or oxygen-containing stream is introduced into the lower portion of the regeneration zone. Thus, the split streams flow in opposing directions through the descending bed to an intermediate or mid-portion of the bed in the upper contacting zone as hereinbefore set forth. The supply of supplementary regenerating medium may be introduced advantageously in a downward direction opposite the upper or discharge end of the vertical riser conduit, in order to preclude the solid particles issuing from the upper end of the riser conduit from impinging against the upper head of the chamber and generally reduce the free space which may otherwise be required above the upper surface of the descending bed of particles. When operating without such opposing inlet it may be desirable to have a substantial distance between the upper head of the regeneration zone and the upper end of the riser conduit so as to provide adequate space for reducing the particle velocity and preventing the breaking of particles against the upper head of the vessel.

The improved operation in accordance with the present invention, as well as further advantageous features in connection therewith, will be more apparent upon reference to the accompanying drawing and the following description thereof.

Referring now to the drawing, there is shown a vertically disposed confined chamber 1, having a lower reaction zone 2 and an upper regeneration zone 3, with an intermediate stripping and sealing zone 4 suitable for passing subdivided solid particles continuously from the upper zone to the lower. In the following description relating to the present improved method of operation, it will be assumed that a hydrocarbon gas oil stream, in either liquid or vaporous phase, is being introduced into contact with a suitable cracking catalyst, preferably spherical in form and permitting a relatively compact bed of particles to descend in a continuous gravity flow through each of the superimposed contacting zones and through the sealing zone 4. The size of the catalyst particles, whether spherical or of other shape, should be sufficiently large that they will not be excessively compacted and thus cause a high pressure drop for the fluid streams passing therethrough and in contact therewith. However, the particle size, or more particularly the average density, should not be sufficiently great in order to hinder their ready transportation by the gas-lift action of the regenerating stream. For example, spherical particles of a cracking catalyst consisting predominantly of silica and one or more metal oxides, such as alumina, zirconia, magnesia, and the like, may have a suitable particle size of the order of from 2 to 5 mm. average diameter. Also, in order to avoid attrition of particles and the presence of substantially fine particles of a powdery or dusty nature within the bed, the particles charged to the system are preferably of substantially uniform or well-graded size.

In the present embodiment, the hydrocarbon oil stream enters chamber 1 at the upper portion of the reaction zone 2 so that vapors pass downwardly through reaction zone 2 concurrently with the descending bed of particles to an outlet header 7, and from the latter a resulting vaporous conversion product stream is discharged by way of conduit 8 and valve 9. In a catalytic cracking operation, the catalyst particles are heated sufficiently within the regeneration zone 3 to supply the necessary endothermic heat for carrying out the desired catalytic cracking operation by contacting the reactant stream within the reaction zone 2. The resulting product stream is separated from the descending bed of particles within the lower portion of the reaction zone 2 by suitable separating means, such as for example a plurality of circular or circular-segmental type of inverted troughs 10, which in turn connect with the outlet header 7, and are screened or constructed so that the small catalyst particles do not flow with the cracked vapors to the outlet conduit 8.

Contacted and contaminated catalyst particles are discharged in a continuous stream from the lower end of the chamber 1 through a standpipe or outlet conduit 11, having control valve 12, to thus enter the lower end of the riser conduit 13. Preferably, steam or other substantially inert gaseous medium is introduced into the outlet line 11 by way of line 14 and valve 15 so that occluded and adsorbed vaporous products may be stripped and removed from the descending stream of catalyst particles.

In accordance with the present improved operation, air or a controlled oxygen-content gaseous stream is introduced by way of line 16 and valve 17 into the lower end of the riser conduit 13 in order to commingle with the stripped contaminated catalyst particles, and the latter are fluidized and lifted in a pneumatic lift manner through the entire vertical height of riser 13 to the upper portion of the regeneration zone 3. The upper end of riser conduit 13 may be provided with an enlarged or flared section 18 so that the velocity of the gaseous regenerating medium and the particles may be reduced and permit the catalyst particles to reverse their direction of flow and settle onto the upper portion of the relatively compact descending bed having its upper extremity indicated by the broken irregular line 19. The air or free oxygen-containing gas also reverses its flow in the upper portion of regeneration zone 3 and passes downwardly concurrently with the descending catalyst particles to an intermediate or approximately mid-portion of the bed of particles being maintained within the upper regeneration zone. Thus, at least a portion of the carbonaceous contaminating matter on the catalyst particles may be oxidized and removed from the particles during the concurrent flow of the oxidizing gas in the riser line 13 and the subsequent concurrent flow in the upper portion of the bed in regeneration zone 3. Where a controlled oxygen-content less than that of air is desired to effect the fluidized lifting of the particles from the lower end of the riser line 13 to the regeneration zone, then an inert gas, or preferably resulting combustion gases from regeneration zone 3 may be recycled to the air inlet line 16 to become admixed with the air or oxygen-containing stream and provide the desired quantity of gaseous medium necessary in the fluidized lift operation. Supplementary air or oxygen may be introduced into the upper portion of the chamber 1 by way of line 20 and control valve 21, so that additional oxygen may be present for the concurrent flow through the upper portion of the bed within regeneration zone 3.

The divided portion or remaining portion of the oxidizing medium for regeneration of the catalyst or other solid particles, in accordance with the present invention, is introduced into the lower portion of regeneration zone 3 by way of inlet conduit 22, valve 23, and a suitable perforate distributing member 24. The present drawing indicates the distributing member 24 to be a downwardly sloping louvred member suitable to uniformly distribute the air or oxygen-containing stream upwardly into the descending bed of particles while at the same time accommodating the continuous downward flow of particles through the entire chamber 1 in a relatively compact bed.

The resulting combustion gases, from both the downward and upward flow of the oxidizing and regenerating gas streams in zone 3, are withdrawn by way of header 25 and outlet conduit 26 having valve 27. The flue gas withdrawal means is located at an intermediate or midportion of the bed within the regeneration zone 3, and as noted in connection with the vapor withdrawal means, suitable inverted trough members 28, which are screened to prevent particle withdrawal, are positioned horizontally in a manner to substantially traverse the entire cross-sectional area of the regeneration zone. Trough members 28 connect with the header 25 in order to provide for the uniform withdrawal of resulting combustion gases from the zone.

The regeneration of the catalyst particles as provided by the present improved arrangement permits each portion of the split regenerating gas stream to pass approximately only half way through the entire descending bed of particles in the regeneration zone. Thus, as hereinbefore set forth, only about one-half of the velocity of an equivalent single stream is necessary, and the resulting lower pressure drops encountered in each portion of the bed are many times smaller than the pressure drop would be for a single stream passing through the entire depth of bed. It may also be noted, that the utilization of a concurrent flow of the entire regenerating gas stream through a compact particle bed is in general undesirable in that there is likely to be excessive burning and oxidation with a confined spot or zone, and resulting excessively high temperatures which may be harmful to the catalyst particles. The reduction of pressure drops permits the utilization of a lower pressure operation throughout the entire unitary chamber, and permits the use of a smaller diameter contacting chamber and contacting zone than would otherwise be necessary for contacting a given quantity of catalyst with a regenerating gas stream passing in a unidirectional flow through the bed particles.

The heated and regenerated catalyst particles passing continuously from the lower end of the bed in the upper regeneration zone 3 pass in an annular descending column of reduced cross-section as provided by the cylindrical wall section 29. The latter in turn is supported by a suitable diaphragm or partitioning member 30, being in the present embodiment a frusto-conical-shaped member connecting to the inside wall of chamber 1 and the upper end of the cylindrical member 29, and separating the reaction zone 2 from the lower regeneration zone 3. The annular zone 4 operates as both a stripping zone and a seal zone, in that steam or other inert gaseous medium is introduced into the lower portion thereof by way of line 31 and valve 32 in a quantity and at a pressure sufficient to preclude the passage of gases or vapors from one of the upper and lower particle contacting zones to the other. In the present embodiment, the steam is distributed uniformly upwardly through the annular shaped seal stripping zone 4 by means of a circumferential perforate or screened member 33 which extends around the lower portion of the cylindrical member 29. Stripping of the regenerated catalyst particles is desirable to prevent the downward flow and passage of oxygen or oxidation product with the catalyst particles into the reaction zone, while of course it is desirable to prevent the upward flow of the reactant stream from the upper portion of reaction zone 2 into the seal and stripping zone. Thus, the steam or stripping medium is introduced into the seal zone 4 at an intermediate elevation between the upper end of this zone and the lower end of the downward extension 34 thereof so that a portion, and preferably a predominant portion, of the sealing and stripping medium passes upwardly countercurrently to the particles and another portion passes downwardly concurrently with the particles. Resulting stripped and hot regenerated catalyst particles pass downwardly through the lower conduit-like section 34 of the seal zone 4 as a column of more restricted cross-sectional area annularly around the riser line 13 and then enter the upper portion of the reaction zone 2 and into contact with the hydrocarbon reactant stream introduced thereto.

For purposes of illustration, the following pressure distribution may be utilized in a single chamber embodiment to provide a balanced bed regeneration operation in accordance with the present invention. A conversion product stream may be discharged by way of conduit 8 at a pressure of the order of about 10 p. s. i. g., suitable for introducing the product to an appropriate fractionation section, and the discharge of a combustion or flue gas stream from the regeneration zone by way of outlet conduit 26 may be at a pressure of the order of about 3 p. s. i. g., whereby the stream may be discharged through a heat recovery exchanger to the atmosphere. In the catalytic cracking of a gas oil stream, in the presence of a cracking catalyst and at suitable cracking conditions, the reactant stream may be normally introduced into the upper portion of the reaction zone 2 at say a pressure of the order of 12 p. s. i. g. The fluidized lift of the contacted particles in riser line 13 is preferably effected with a minimum pressure drop; thus, the air stream being introduced through line 16 to the lower portion of the riser 13 may be of the order of about 12½ p. s. i. g. and effect the discharge of the particles into the upper portion of regeneration zone 3 at a pressure therein of the order of about 11 p. s. i. g. For the desired residence time and regeneration contact necessary to substantially remove carbonaceous matter from the catalyst particles, and in order to maintain the desired balanced bed operation, with the split flow of the regenerating gas stream in concurrent downward flow and countercurrent upward flow with respect to the catalyst particles in the compact descending bed in the regeneration zone 3, the air supply at the discharge end portion of conduit 22 is also maintained at a pressure of about 11 p. s.i. g. to thus provide the discharge of resulting combustion gases from conduit 26 at about 3 p. s. i. g. The stripping zone 4 is preferably constructed and maintained in a manner having a sufficient depth to insure adequate stripping of oxidation and combustion gases as well as oxygen, from the regenerated particles. Thus, the stripping and seal steam is introduced into seal zone 4 by way of line 31 at a pressure of about 12½ p. s. i. g. so that at least a portion of the steam flows both upwardly and downwardly through the seal zone and prevents the upward flow of the hydrocarbon reactant stream into the conduit 34, as well as the downward flow of air or combustion gas from the lower portion of regeneration zone 3 along with the descending bed of particles.

The foregoing pressures are of course merely comparative, relative to each other, and are in no way intended to be limiting. The method of the invention may be practiced at higher or lower levels of operating pressures ranging from subatmospheric to substantial superatmospheric. For any given general pressure level, moreover, the precise operating pressure at each critical zone of the circulatory system will vary with the depth of the respective bed portions and the type and size of catalyst or other solid particles utilized in the unit. However, it is desirable to utilize a uniform size or cross-sectional area for the superimposed contacting zones and to provide a balance of pressures, such as set forth, so that the resulting pressure drops and the velocities of fluid flow within each portion of the unit assure a smooth and continuous overall operation and a rapid conversion of the reactant stream. In the case of increased capacity conversion units, the diameter or cross-sectional area of the contacting zones may be increased proportionately, in order to accommodate the greater flow of quantities, without unduly affecting the pressure drops through the various zones.

As an alternative to the operation of the present unit shown and described, the reactant stream may be introduced into the lower portion of the descending catalyst bed within the lower end of the reaction zone 2, and the resulting conversion product stream withdrawn from above the catalyst bed at the top of the reaction zone 2. This mode of operation is not exactly equivalent to that described above with reference to downflow of hydrocarbonaceous reactant through the bed portion in the reaction zone; its particular advantage resides in permitting the regeneration in the descending bed portions in the regeneration zone at an appreciably lower average pressure than the average pressure prevailing in the lower reaction zone. It may also be pointed out that in the operation utilizing supplemental air or oxygen through the inlet line 20, which in turn passes directly into the top end of the chamber 1, that a preferred arrangement utilizes a distributing nozzle, such as 35, in order that the inlet stream substantially oppose the upwardly flowing air and combustion gas stream issuing from the top end of the riser at 18. Thus, catalyst particles are prevented from impinging against the top end of the chamber 1 in a manner precluding the attrition and breakage of particles or erosion of the upper chamber head in an undesirable manner.

The apparatus described above with reference to a catalytic hydrocarbon conversion operation, such as the catalytic cracking of gas oils, may be used in analogous manner in applying the present method to thermal conversions of hydrocarbonaceous reactants in the presence of heated substantially inert solid particles with deposition of combustible matter on the particles in the lower reaction zone and reactivation and heating of the contacted particles by combustion of deposited matter in the fluidized up-flow transfer path and in the bed portions in the upper regeneration zone, the flow of opposed oxidizing gas streams downwardly through the upper portion and upwardly through the lower portion of the descending compact bed in the regeneration zone being maintained substantially as already described.

Similarly, and without departing from the principal teaching of this invention, solid reactive material may be treated by the present method with gasiform reactants in substantially the same apparatus with but minor modifications to provide for suitable inlet and withdrawal conduits at appropriate points of the system for introducing fresh particulated solid charge into, and withdrawing a stream of reacted solid particles from the solids cycle of the system. By way of example, solid carbonaceous or hydrocarbonaceous material may be supplied through a solids feed inlet to the top of the bed portion in the lower reaction zone 2 and subjected during its downward passage through this zone to gasification by countercurrent flow and reaction with superheated steam, or to distillative carbonization by countercurrent contact with a gasiform distilling medium such as steam, carbonaceous residue being passed in either case from the bottom portion of the descending bed and carried as a fluidized stream in oxidizing gas through the riser conduit 13 to the top portion of the upper regeneration zone 3 with continued partial combustion of the carbonized residue by means of opposed streams of oxidizing gas in the latter zone under conditions controlled to impart a substantial portion or practically the whole of the heat required for the reaction in the lower zone to the residual solid gravitating from the upper zone 3 through the seal zone 4 into the lower zone 1, while a portion of the heated residue is separately withdrawn from the lower portion of the regenerating and heating zone 3 and from the system and gasiform reaction products are removed from the top portion of the lower reaction zone with discharge of the combustion gases from the heating zone 3 through the header 25 and flue gas outlet 26.

Heavy hydrocarbon oil or residue may be converted into particulated dry coke with the aid of a descending bed of coke particles which are heated by controlled partial combustion with the aid of opposed streams of oxidizing gas in the upper contacting or heating zone 3 to a sufficient temperature to effect, upon gravitational passage of a regulated portion thereof through the seal zone 4 into the reaction zone 1, the cracking and conversion into solid residual particles and vaporous hydrocarbon products of the heavy hydrocarbon charge introduced into the hot coke bed portion in the reaction zone 1 through a suitable oil inlet, preferably through the conduit 5 provided at a point or level of zone 1 above the bed portion therein, the vaporous hydrocarbon products being in such operation withdrawn preferably through header 7 and outlet 8 while the combustion gases are discharged through the header 25 and flue gas outlet 26 and a product stream of coke particles of practically zero volatile content is separately removed from the lower bed portion of the heating zone 3 through a suitable outlet substantially at the rate at which such coke is formed in the system.

In all of the various modes, described above, of applying the present method of moving bed operation with the aid of the apparatus diagrammatically illustrated as to its principal parts of construction and arrangement, a material benefit is obtained from the favorable heat distribution and heat conservation in the system as well as from the balanced bed operation in the regeneration or oxidizing and heating stage of the operation. It is to be understood that the terms "moving bed" and "descending bed" as used herein are intended to mean a body of solid particles in which the particles remain in direct contact and move at substantially the same rate as the body thereof with respect to the retaining walls of the zone through which the body passes, whereas the expression "fluidized phase" as used herein is intended to mean a dispersed suspension of solid particles in a current of fluid rising past the particles under conditions of continuous solids entrainment, the dispersed suspension exhibiting the mobility of a fluid.

I claim as my invention:

1. A method for regenerating subdivided solid particles with a regenerating stream in a confined zone, which comprises, continuously carrying contacted particles in a fluidized phase with a fluid regenerating stream into the upper portion of said zone, permitting said particles to settle to the top of a continuously descending relatively compact bed of particles in said zone and passing said stream concurrently downward with the particles to an intermediate portion of said bed therein and effecting the removal from said particles of at least a portion of the constituents thereof reactive with said regenerating stream, passing a separate stream of fluid regenerating medium upwardly through the descending bed of particles within the lower portion of said zone and to said intermediate portion of said bed, whereby to effect further reactivation of said particles, combining the upwardly and downwardly flowing fluid regeneration streams at said intermediate portion of said bed and discharging them from said zone, and continuously discharging resulting reactivated particles from the lower end thereof.

2. A method for continuously contacting a reactant stream with subdivided solid particles, which comprises, continuously passing freshly reactivated and heated particles downwardly through a confined reaction zone in a substantially compact descending bed and passing said reactant stream therethrough, separating and withdrawing a resulting conversion product stream from said reaction zone and continuously discharging resulting contacted particles from the lower end thereof, commingling a stream of the discharged particles with a stream of controlled content of fluid reactivating medium and carrying said particles in fluidized phase through a confined path to the upper portion of a confined reactivating and heating zone of higher elevation, permitting the thus transported particles to settle to the top of a continuously descending relatively compact bed of particles in said reactivating zone and passing said reactivating stream concurrently downwardly with the particles through the upper part of the descending bed to an intermediate portion thereof within said reactivating zone and effecting the removal from said particles of at least a portion of the constituents thereof reactive with said reactivating medium, passing a separate stream of fluid reactivating medium upwardly through the descending bed of particles within the lower portion of said reactivating zone and to said intermediate portion of said bed, whereby to effect further heating and reactivation of said particles, combining the upwardly and downwardly flowing fluid reactivation streams at said intermediate portion of said bed in said reactivating zone and discharging them therefrom, and continuously passing resulting reactivated and heated particles from the lower end of said reactivating zone substantially by gravity to the upper portion of said confined reaction zone.

3. A method for continuously contacting and converting a hydrocarbon reactant stream with subdivided solid catalyst particles, which comprises, maintaining a continuously descending bed of catalyst particles through a lower reaction zone and a superimposed regeneration zone, continuously passing the lower portion of said descending bed of catalyst particles in freshly heated and regenerated state downwardly through said lower reaction zone concurrently with said hydrocarbon reactant stream, with the latter being continuously introduced into the upper portion of the latter zone, separating and withdrawing a resulting fluid conversion product stream from the lower portion of said reaction zone and continuously discharging resulting contacted catalyst particles from the lower portion thereof, commingling discharged catalyst particles with a regenerating gas stream of controlled oxygen content and elevating them in fluidized phase through a confined path extending through said descending bed of catalyst particles within said reaction zone and within said superimposed regeneration zone to the upper portion of the latter zone, permitting the catalyst particles to settle to the top of said descending bed while reversing the flow of the fluidizing oxygen-containing stream and passing it downwardly through the upper portion of said descending bed of catalyst particles to an intermediate portion of the bed in said superimposed regeneration zone in a manner effecting the oxidation and removal of at least a portion of the contaminating matter from said catalyst particles, passing a separate portion of regenerating gas of controlled oxygen content upwardly through and countercurrently to the descending bed of particles within the lower portion of said regeneration zone to said intermediate portion thereof, whereby to effect the substantially complete oxidation and removal of contaminating matter from said catalyst, commingling the upwardly and downwardly flowing streams of resulting combustion gases in and discharging the same from said intermediate portion of said bed maintained with said regeneration zone, and continuously passing resulting heated and regenerated particles from the lower portion of said regeneration zone to the upper portion of said lower reaction zone for contact with said reactant stream as aforesaid.

4. The method of claim 3 further characterized in that said continuously descending bed of catalyst particles is restricted in cross-sectional area between said reaction and regeneration zones, and a substantially inert fluid stripping and sealing medium is introduced into said restricted cross-sectional area zone at an intermediate elevation thereof and at a pressure effecting both an upward and downward flow of said sealing medium.

5. The method of claim 3 further characterized in that an additional oxidizing stream of controlled free oxygen content is introduced into the upper portion of said superimposed regeneration zone and commingled with the oxygen-containing transporting stream issuing from said confined path whereby additional oxygen is caused to pass downwardly concurrently with the descending catalyst particles to the intermediate portion of said regeneration zone.

6. The method of claim 5 further characterized in that the additional oxygen-containing stream being introduced into the upper portion of said regeneration zone is distributed downwardly from the upper end thereof in a manner opposing the upward flow of the mixed fluidized catalyst particles and oxygen-containing stream issuing from said confined path into the upper portion of said regeneration zone.

7. A method for continuously contacting and converting a hydrocarbon reactant stream with subdivided solid catalyst particles, which comprises, maintaining a continuously descending bed of catalyst particles through a lower reaction zone and a superimposed regeneration zone, continuously introducing said hydrocarbon reactant stream into said reaction zone and passing it concurrently downwardly through the lower portion of said descending bed of catalyst particles maintained within said reaction zone, continuously separating and withdrawing a resulting fluid conversion product stream from the lower portion of the bed in said reaction zone while continuously discharging resulting contacted and contaminated catalyst particles from the lower end portion of said reaction zone, commingling the discharged catalyst particles with a regenerating gas stream of controlled oxygen content and of hot combustion gases obtained as hereinafter set forth, elevating said contacted catalyst particles in fluidized phase through a confined path extending through said descending bed of catalyst particles within said reaction zone and within said superimposed regeneration zone to the upper portion of the latter zone, permitting the catalyst particles to settle to the top of said descending bed of particles while reversing the flow of the fluidizing stream and passing it downwardly through the upper portion of said descending bed to an intermediate portion thereof within said superimposed regeneration zone, thereby effecting the oxidation and removal of a portion of the contaminating matter from said contacted catalyst particles, passing a separate portion of regenerating gas of controlled oxygen content upwardly through and countercurrently to the descending bed of particles within the lower portion of said superimposed regeneration zone to the intermediate portion thereof, and thereby effecting the substantially complete oxidation and removal of contaminating matter from said catalyst particles, discharging the resulting opposed streams of combustion gases in a commingled state from said intermediate portion of the bed in said regeneration zone and from the latter zone, recycling at least a portion of said combustion gases to commingle with the contacted catalyst particles withdrawn from the lower end portion of the reaction zone as the hot combustion gas stream forming a part of the regenerating gas of controlled oxygen content, and continuously passing resulting heated and regenerated catalyst particles from the lower end portion of said regeneration zone by gravity to the upper portion of said reaction zone and into contact therein with said hydrocarbon reactant stream as aforesaid.

8. In the regeneration of subdivided solid catalyst particles by contact with oxygen-containing gas in a combustion zone to burn carbonaceous contaminants from the catalyst, the method which comprises maintaining a relatively compact, vertically elongated bed of catalyst particles in said zone, continuously removing regenerated particles from the bottom and adding contaminated particles by fluidized transfer to the top of the bed to maintain the bed in continuous descent through said zone, passing a portion of said gas downwardly through only the upper part of said bed in concurrent contact with the descending particles therein, simultaneously passing another portion of said gas upwardly through only the lower part of said bed in countercurrent contact with the descending particles therein, commingling the upwardly and downwardly flowing gases in an intermediate part of the bed spaced a substantial distance from the top and bottom of the bed, and removing the commingled gases from said intermediate part of the bed and from said zone.

9. The method of claim 8 further characterized in that the said upper and lower parts of the bed are of approximately equal height, with said intermediate part being at about the midportion of the bed.

References Cited in the file of this patent

UNITED STATES PATENTS

| Number | Name | Date |
|---|---|---|
| 2,379,408 | Arveson | July 3, 1945 |
| 2,395,106 | Day et al. | Feb. 19, 1946 |
| 2,412,152 | Huff | Dec. 3, 1946 |
| 2,440,475 | Jacomini | Apr. 27, 1948 |
| 2,446,678 | Voorhees | Aug. 10, 1948 |
| 2,450,753 | Guyer | Oct. 5, 1948 |
| 2,487,961 | Angell | Nov. 15, 1949 |